United States Patent
Monteuuis et al.

(10) Patent No.: US 11,937,087 B2
(45) Date of Patent: Mar. 19, 2024

(54) VEHICLE-TO-EVERYTHING (V2X) PARTICIPANT TYPE-BASED MISBEHAVIOR DETECTION

(71) Applicant: QUALCOMM Incorporated, San Diego, CA (US)

(72) Inventors: Jean-Philippe Monteuuis, Shrewsbury, MA (US); Jonathan Petit, Wenham, MA (US); Mohammad Raashid Ansari, Lowell, MA (US); Cong Chen, Shrewsbury, MA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 17/385,023

(22) Filed: Jul. 26, 2021

(65) Prior Publication Data
US 2023/0021487 A1    Jan. 26, 2023

(51) Int. Cl.
*H04W 12/122* (2021.01)
*H04W 4/40* (2018.01)

(52) U.S. Cl.
CPC ........... *H04W 12/122* (2021.01); *H04W 4/40* (2018.02)

(58) Field of Classification Search
CPC ........ H04W 12/122; H04W 4/40; H04W 4/46
See application file for complete search history.

(56) References Cited

U.S. PATENT DOCUMENTS

| 2019/0164049 | A1 | 5/2019 | Bai et al. | |
| 2019/0312896 | A1* | 10/2019 | Petit | H04W 4/46 |
| 2022/0345856 | A1* | 10/2022 | Frye | H04W 4/40 |

FOREIGN PATENT DOCUMENTS

EP    3709057 A1    9/2020

OTHER PUBLICATIONS

International Search Report and Written Opinion—PCT/US2022/031901—ISA/EPO—dated Sep. 16, 2022.

* cited by examiner

*Primary Examiner* — Nguyen T Vo
(74) *Attorney, Agent, or Firm* — The Marbury Law Group

(57) ABSTRACT

In various embodiments, a vehicle processing device may receive a vehicle-to-everything (V2X) message from an ITS participant, the message including an ITS participant type indication, determine detector settings based on the ITS participant type for one or more detectors configured to evaluate an aspect of the ITS participant, determine whether information in the V2X message is plausible using the detector settings based on the ITS participant type for the one or more detectors, and perform a security action in response to determining that the information in the V2X message is not plausible.

30 Claims, 11 Drawing Sheets

Example protocol stack and related core standards for C-ITS in Europe

400b

If (StationType== Pedestrian)
    Settings_1 = {$s_{11}, s_{12},..., s_{1N}$}

...

Settings_J = {$s_{J1}, s_{J2},..., s_{JM}$}

Else if (StationType== Car)

Settings_1

...

Settings_J

Else if (StationType== $Type_z$)

FIG. 4B

VEHICLE-TO-EVERYTHING (V2X) PARTICIPANT TYPE-BASED MISBEHAVIOR DETECTION

BACKGROUND

Multiple regions of the world are developing standards for vehicle-based communication systems and functionality. Standards developed in Institute of Electrical and Electronics Engineers (IEEE) and Society of Automotive Engineers (SAE) for use in North America, or in European Telecommunications Standards Institute (ETSI) and European Committee for Standardization (CEN) for use in Europe. The IEEE 802.11p standard is the basis for the Dedicated Short Range Communication (DSRC) and ITS-G5 communication standards. IEEE 1609 is a higher layer standard based on IEEE 802.11p. The Cellular Vehicle-to-Everything (C-V2X) standard is a competing standard developed under the auspices of the 3rd Generation Partnership Project. These standards serve as the foundation for vehicle-based wireless communications, and may be used to support intelligent highways, autonomous and semi-autonomous vehicles, and improve the overall efficiency and safety of the highway transportation systems. Other V2X wireless technologies are also under consideration in different regions of the world. The techniques described herein are applicable to any V2X wireless technology.

The C-V2X protocol defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V21), and vehicle-to-pedestrian (V2P), and that provides enhanced communication range and reliability in the dedicated Intelligent Transportation System (ITS) 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation new radio wireless mobile communication technologies (5G NR systems, etc.), etc.

An element of V2X systems is the ability for a vehicle to broadcast Basic Safety Messages (BSM) in North America or Cooperative Awareness Messages (CAM) in Europe, which other vehicles can receive and process to improve traffic safety. The processing of such messages in the transmitting and receiving vehicles may be performed by a processor or processing system of onboard equipment that provides the vehicle-to-everything (V2X) functionality (referred to herein as "V2X onboard equipment").

V2X onboard equipment may be configured to detect inaccurate or intentionally false information in a V2X message received from another vehicle or from the ITS system. Conventional V2X onboard equipment is configured with a one-size-fits-all detection process that is applied to every ITS participant regardless of whether the ITS participant is a motorcycle, car, truck, pedestrian, or other ITS participant type. Such a one-size-fits-all detection process may cause a vehicle to inaccurately determine aspects of ITS participants, such as inaccurately determining an ITS participant's length, width, speed, acceleration, etc. These types of inaccurate determinations may cause a vehicle to make incorrect or inappropriate decisions for maneuvering, path planning, and/or braking, including such functions as Cooperative and Automated Emergency Brake (Co-AEB). Such inaccurate detections negatively affect ITS safety and efficiency.

SUMMARY

Various aspects include methods of misbehavior detection performed by a vehicle processing system, such as a vehicle-to-everything (V2X) processing device. Various embodiments enable a vehicle processing system (e.g., a V2X processing device, such as in V2X onboard equipment) to detect unintentionally inaccurate or intentionally false information reported by another ITS participant in a V2X message, and to perform a security action in response to that detection.

Various aspects may include receiving a V2X message from an Intelligent Transportation System (ITS) participant, the message including an ITS participant type indication, determining detector settings based on the ITS participant type for one or more detectors configured to evaluate an aspect of the ITS participant, determining whether information in the V2X message is plausible using the detector settings based on the ITS participant type for the one or more detectors, and performing a security action in response to determining that the information in the V2X message is not plausible. In some aspects, the one or more detectors may include one or more of a length detector, a width detector, a height detector, a position detector, a speed detector, an acceleration detector, an orientation detector, or a behavior detector. In some aspects, the ITS participant type may include one or more of a car, a truck, a bus, a train, a boat, a pedestrian, a bicycle, a motorcycle, or a scooter.

In some aspects, determining detector settings based on the ITS participant type may include determining one or more maximum or minimum plausible parameters for each of the one or more detectors for the ITS participant type. Some aspects may include determining a V2X message type of the V2X message, and determining whether the ITS participant type is permitted to send the V2X message of the V2X message type, in which determining detector settings based on the ITS participant type for one or more detectors configured to evaluate an aspect of the ITS participant may include determining detector settings based on the ITS participant type for one or more detectors configured to evaluate an aspect of the ITS participant in response to determining that the ITS participant type is permitted to send the V2X message of the V2X message type. Some aspects may include performing a security action in response to determining that the ITS participant type is not permitted to send the V2X message of the V2X message type.

Some aspects may include determining an ITS participant type using information about the ITS participant received from one or more vehicle sensors, and determining whether the ITS participant type determined using information about the ITS participant received from one or more vehicle sensors matches the ITS participant type included in the V2X message, in which determining detector settings based on the ITS participant type for one or more detectors configured to evaluate an aspect of the ITS participant may include determining detector settings based on the ITS participant type for one or more detectors configured to evaluate an aspect of the ITS participant in response to determining that the ITS participant type determined using information about the ITS participant received from one or more vehicle sensors matches the ITS participant type included in the V2X message. Some aspects may include performing a security action in response to determining that the ITS participant type determined using information about the ITS participant received from one or more vehicle sensors does not match the ITS participant type included in the V2X message.

Some aspects may include configuring the vehicle processing system with a plurality of ITS participant types and associated detector settings for each ITS participant type, in which determining detector settings based on the ITS participant type for one or more detectors may include identifying the detector settings associated with the ITS participant type.

In some aspects, configuring the vehicle processing system with a plurality of ITS participant types and associated detector settings for each ITS participant type may include providing as input to an ITS participant type model a plurality of observations of parameters of a selected ITS participant type, receiving as output from the ITS participant type model the detector settings for the one or more detectors configured to evaluate an aspect of the ITS participant, and storing detector settings for the selected ITS participant type in memory accessible by the vehicle processing system.

Some aspects may include receiving from a remote source detector settings or detector setting updates for one or more ITS participant types, and storing the detector settings based on the ITS participant type in a compartmentalized manner by ITS participant type. In some aspects, performing a security action in response to determining that the information in the V2X message is not plausible may include transmitting a misbehavior report about the ITS participant. In some aspects, performing a security action in response to determining that the information in the V2X message is not plausible may include transmitting a warning about the ITS participant to another ITS participant.

Further aspects include a vehicle processing system including a memory and a processor configured to perform operations of any of the methods summarized above. Further aspects may include a vehicle processing system having various means for performing functions corresponding to any of the methods summarized above. Further aspects may include a non-transitory processor-readable storage medium having stored thereon processor-executable instructions configured to cause a processor of a vehicle processing system to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

FIG. 4B illustrates an algorithm to determine detector settings for detectors based on an ITS participant type.

DETAILED DESCRIPTION

Figure 1A:
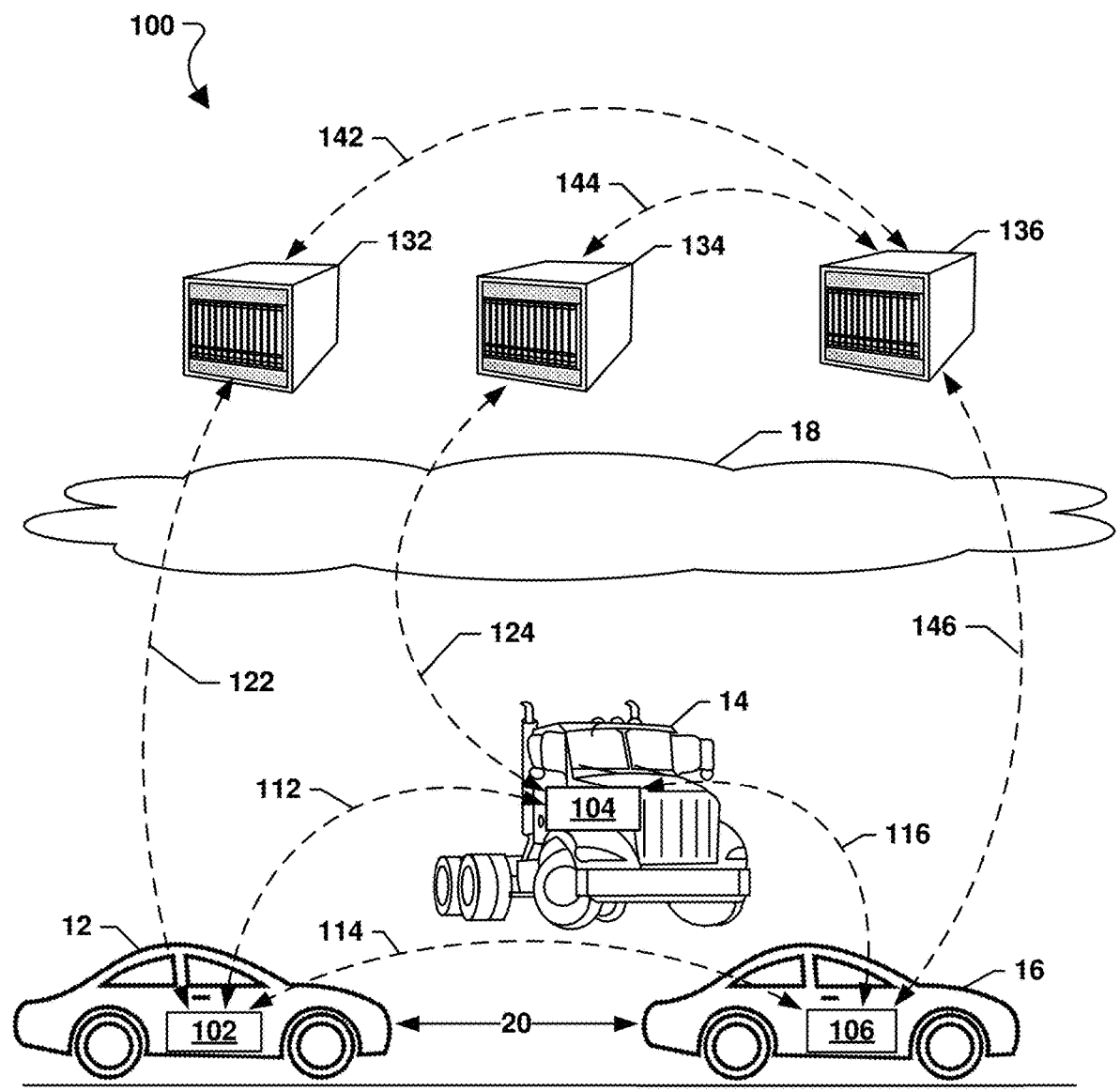
FIG. 1A is a system block diagram illustrating an example V2X system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In overview, various embodiments include methods and mechanisms for detecting misbehavior of an intelligent transportation system (ITS) participant, such as an ITS station. Various embodiments enable a vehicle processing system (e.g., a V2X processing device, such as in V2X onboard equipment) to detect unintentionally inaccurate or intentionally false information reported by another ITS participant in a V2X message, and to perform a security action in response to that detection. Various embodiments enable a vehicle processing system to determine whether information in a received V2X message is plausible based on the ITS participant type of the sender of the V2X message, and to perform a security action in response to determining that the information in the V2X message is not plausible.

As used herein, "ITS participant" refers to a sender and/or receiver of V2X messages in an ITS, for example, a car, a truck, a bus, a train, a boat, a pedestrian, a bicycle, a motorcycle, a scooter, any other type of ITS station, or any other suitable ITS participant type. An ITS participant may be associated with an "ITS participant type" that indicates, for example, that the ITS participant is a car, a truck, a bus, etc. The ITS participant type is information that may be transmitted in a V2X message.

As used herein, "detector" refers to an operation or operations performed by a processor or processing device of a vehicle processing system (e.g., of V2X onboard equipment). A detector may be configured with one or more detector settings, and may operate on information provided by one or more vehicle sensors. For example, a detector may be configured with one or more detector settings and may operate on information provided by one or more vehicle sensors to determine whether information a V2X message from another ITS participant is plausible, as further described below.

V2X systems and technologies hold great promise for improving traffic flows and vehicle safety by enabling vehicles to share information regarding their location, speed, direction of travel, braking, and other factors that may be useful to other vehicles for anti-collision and other safety functions. Vehicles equipped with V2X/V2V onboard equipment may frequently (e.g. up to 20 times per second) transmit their vehicle information in packets referred to as Basic Safety Messages (BSM) or Cooperative Awareness Message (CAM). With all V2X equipped vehicles transmitting such BSM/CAM messages, all receiving vehicles have the information required to control their own speed and direction to avoid collisions and efficiently and safely position vehicles with respect to each other. It is envisioned that V2X equipped vehicles may be able to improve traffic flow by safely reducing separation distances, platooning several vehicles together, and avoiding vehicles experiencing breakdowns.

In V2X communications, it is important that inaccurate, corrupted, or intentionally falsified (e.g., "hacked" or "spoofed") data is detected in order to prevent such inaccurate data from further dissemination. However, as an increasing number of ITS participants are equipped to participate in such networks, the volume of potentially inaccurate, corrupted, or intentionally falsified information (sometimes referred to herein as "misbehavior") is large and growing at an exponential rate. For example, a misbehaving ITS participant that is a car may send a V2X message that inaccurately declares that the car has the dimensions of a bus, in order to fool other nearby ITS participants into staying further away from the car. As another example, a misbehaving ITS participant may inaccurately indicate that the width of the ITS participant occupies most of the road width, so that other vehicles do not attempt to pass the ITS participant. As another a misbehaving ITS participant (e.g., a scooter) may inaccurately indicate its ITS participant type as a pedestrian in order to drive on a sidewalk without triggering, e.g., an alert from the ITS to the police. Such misbehavior by ITS participants, whether the result of malfunctioning equipment or an intentional attack, can greatly reduce the efficiency of the ITS, and in some cases may place human health and safety at risk.

Various embodiments include methods and processors of vehicle processing devices and systems configured to perform the methods for detecting misbehavior in a V2X message, and responding to such detection by, for example, performing an appropriate security action. Various embodiments may detect misbehavior in a V2X message by determining based on an ITS participant type reported in the V2X message whether one or more aspects of the ITS participant are plausible (e.g., meet, fall within, or exceed, a value or range of values for an aspect of the ITS participant).

In some embodiments, a processor of a vehicle processing system may receive a V2X message from an ITS participant. The V2X message may include an ITS participant type that indicates that the ITS participant is, for example, a car, a truck, a bus, a train, a boat, a pedestrian, a bicycle, a motorcycle, a scooter, and/or the like. In some embodiments, the V2X message also may include information indicating one or more aspects of the ITS participant, such as a length, a width, a height, a position, a speed, an acceleration, an orientation, a behavior such as braking, and/or another suitable aspect of the ITS participant.

In some embodiments, the processor may determine detector settings based on the ITS participant type for one or more detectors that are configured to detect an aspect of the ITS participant. In some embodiments, the vehicle processing system may be configured with one or more detectors, such as a length detector, a width detector, a height detector, a position detector, a speed detector, an acceleration detector, an orientation detector, a behavior detector, and/or another suitable detector, each configured to evaluate information provided in the V2X message about an aspect of the ITS participant. In various embodiments, the one or more detectors may be implemented in hardware, software, or a combination of hardware and software. In some embodiments, the processor may determine one or more maximum or minimum plausible parameters for each of the one or more detectors for a particular ITS participant type. In some embodiments, the vehicle processing system may be configured with a plurality of ITS participant types and associated detector settings for each ITS participant type.

In some embodiments, the processor may employ a machine learning process to initially determine, or to refine, detector settings for an ITS participant type. In some embodiments, the processor may provide a plurality of observations of parameters of an ITS participant type to a trained model, such as an ITS participant type model, and may receive as output from the model (e.g., the ITS participant type model) detector settings for one or more detectors that are configured to evaluate an aspect of an ITS participant.

In some embodiments, the processor may store the detector settings for each ITS participant type in a memory that is accessible by the vehicle processing system (for example, by an ITS participant type). In some embodiments, the processor may receive updates via a wireless network (e.g., V2X from a roadside unit (RSU), a 5G network, etc.) from a central source that distributes detector settings and setting updates to some or all ITS participants in a region. Such distributed detector settings or detector setting updates may be provided on the basis of ITS participant type. Detector settings or detector setting updates may be distributed among ITS participants at any level of specificity or granularity, including one or more parameters of a single ITS participant type. For example, an ITS participant processor may receive and store an update indicating a car's maximum plausible speed. In this manner, the detector settings may be received, updated, and/or stored in a compartmentalized manner, for example, individually, and/or by ITS participant type. By enabling detector settings to be received, updated, and/or stored for as little as a single detector setting for an ITS participant type, the detector settings may be more robust against tampering or the introduction of false or spurious settings. For example, an update including a false setting for a car's maximum plausible speed may affect detections related to cars, but will not affect detections related to other ITS participant types (e.g., buses, motorcycles, pedestrians, etc.).

In some embodiments, the processor may determine whether information in the V2X message is plausible or implausible using the detector settings that are based on the ITS participant type. In some embodiments, the processor may determine whether a message is implausible based on whether information in the V2X message meets (e.g., is equal to or exceeds) a maximum or minimum plausible parameter for a detector. In some embodiments, the processor may determine whether a message is plausible or implausible based on the output of a number of detectors. In some embodiments, in response to determining that the information in the V2X message is implausible, the processor may perform a security action. For example, the processor may transmit a misbehavior report about the ITS participant to an ITS network element, such as a security server, or to a network element performing a similar or suitable function.

Various embodiments may improve the operations of a vehicle processing system by enabling detection of ITS misbehavior as well as enable mitigation of detected inaccurate or spurious information. Various embodiments may improve the operations of an ITS or V2X network by improving the accuracy of information in the ITS by decreasing the transmission of inaccurate V2X information. Various embodiments may improve ITS safety by enabling ITS participants (such as V2X equipped vehicles) to avoid taking actions in response to inaccurate or implausible information in received V2X messages.

For ease of reference, some of the embodiments are described in this application with reference to a vehicle using V2X systems and protocols. However, it should be understood that various embodiments encompass any or all of the V2X or vehicle-based communication standards, messages, protocols, and/or technologies. As such, nothing in the application should be construed to limit the claims to a particular system (e.g., V2X) or message or messaging protocol (e.g., Basic Safety Message (BSM)) unless expressly recited as such in the claims. In addition, the embodiments described herein may refer to a V2X processing system in a vehicle. Other embodiments are contemplated in which the V2X processing system may operate in or be included in mobile devices, mobile computers, roadside units (RSUs), and other devices that are equipped to monitor road and vehicle conditions and to participate in V2X communications.

Figure 1B:
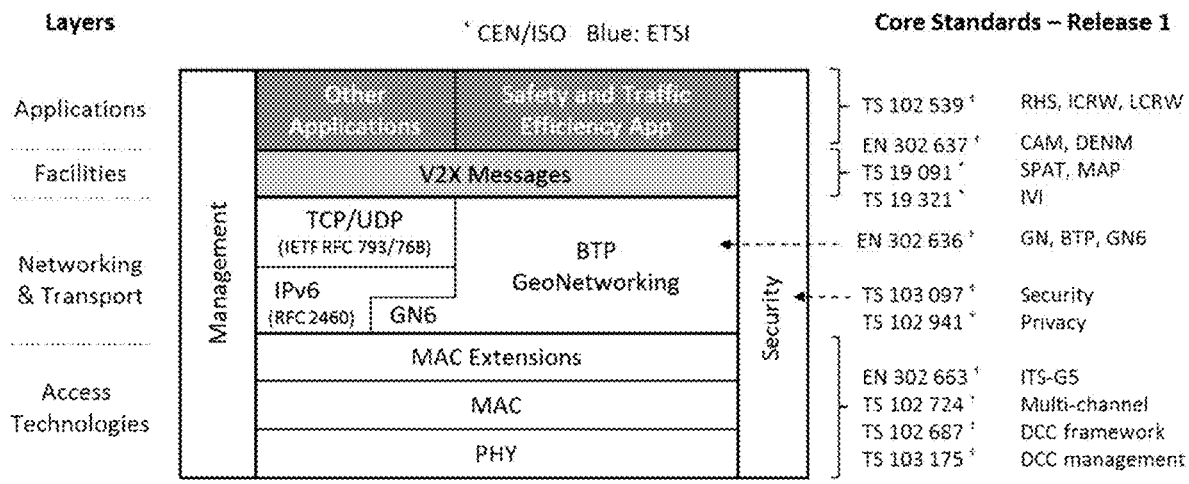
FIG. 1B is a conceptual diagram illustrating an example V2X communication protocol stack suitable for implementing various embodiments.

FIG. 1A is a system block diagram illustrating an example V2X system 100 suitable for implementing various embodiments. FIG. 1B is a conceptual diagram illustrating an example V2X communication protocol stack 150 suitable for implementing various embodiments. With reference to FIGS. 1A and 1B, a vehicle 12, 14, 16 may include V2X onboard equipment 102, 104, 106, respectively, that may be configured to periodically broadcast Basic Safety Messages 112, 114, 116 for receipt and processing by other vehicles' onboard equipment (e.g., 102, 104, 106).

By sharing the vehicle location, speed, direction, behavior such as braking, and other information, vehicles can maintain safe separation and identify and avoid potential collisions. For example, a trailing vehicle 12 receiving Basic Safety Messages 114 from a leading vehicle 16 can determine the speed and location of the vehicle 16, enabling vehicle 12 to match the speed and maintain a safe separation distance 20. By being informed through Basic Safety Messages 114 when the leading vehicles 16 applies the brakes, the V2X equipment 102 in the trailing vehicle 12 can apply brakes simultaneously to maintain the safe separation distance 20 even when the leading vehicle 16 stops suddenly. As another example, the V2X equipment 104 within the truck vehicle 14 may receive Basic Safety Messages 112, 116 from the two vehicles 12, 16, and thus be informed that the truck vehicle 14 should stop at an intersection to avoid a collision. Further, each of the vehicle V2X on-board equipment 102, 104, 106 may communicate with one another using any of a variety close proximity communication protocols.

In addition, the vehicles may be able to transmit data and information regarding Basic Safety Messages and other V2X communications to a variety of network elements 132, 134, 136 via communication links 122, 124, 146 through a communication network 18 (e.g., V2X, cellular, WiFi, etc.) For example, network element 132 may be incorporate into, or may be in communication with, an RSU, a gantry unit, and/or the like. The network element 134, 136 may be configured to perform a function or service related to a vehicle 12, 14, 16, such as payment processing, road condition monitoring, emergency provider message handling, and the like. The network element 134, 136 may be configured to communicate with one another through wired or wireless networks 142, 144 to exchanging information associated with payment processing, road condition monitoring, emergency provider message handling, and similar services.

Figure 2:
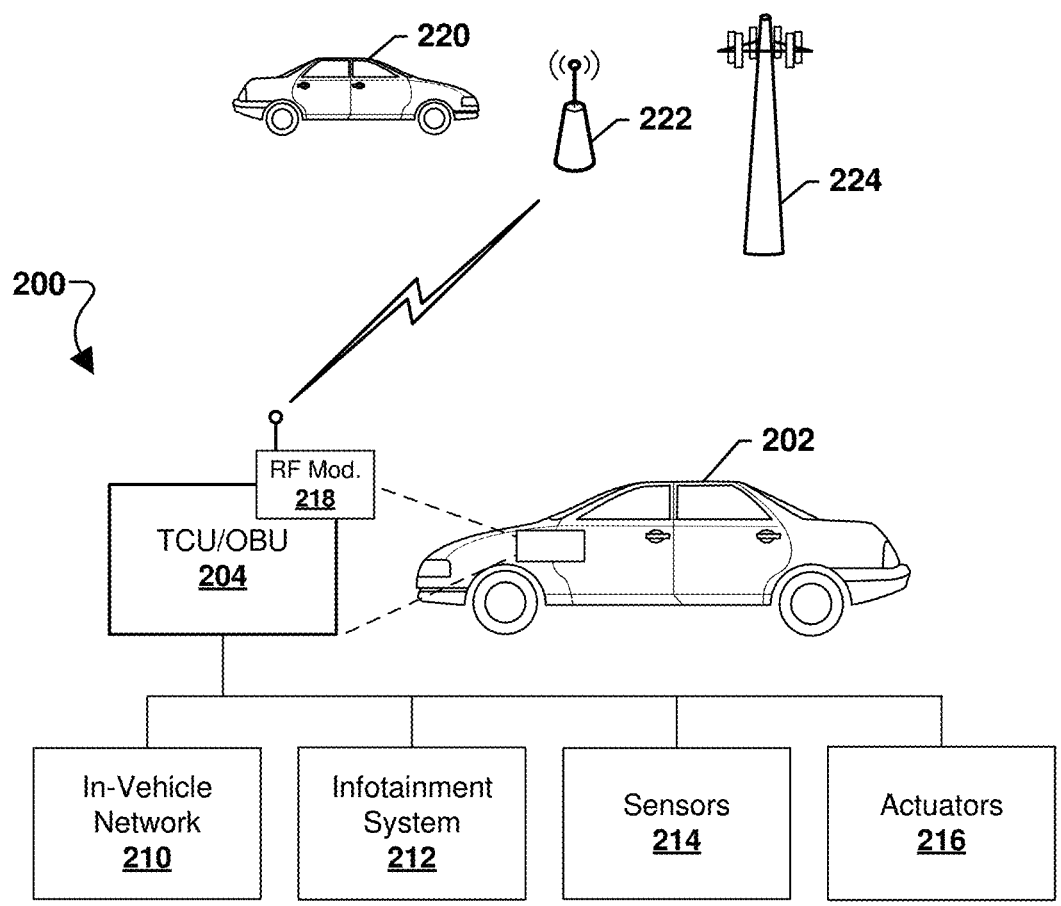
FIG. 2 is a component diagram of an example vehicle system suitable for implementing various embodiments.

FIG. 2 is a component diagram of an example vehicle system 200 suitable for implementing various embodiments. With reference to FIGS. 1A-2, the system 200 may include a vehicle 202 that includes a V2X processing device 204 (for example, a telematics control unit or on-board unit (TCU/OBU). The V2X processing device 202 may communicate with various systems and devices, such as an in-vehicle network 210, an infotainment system 212, various sensors 214, various actuators 216, and a radio frequency (RF) module 218. The V2X processing device 202 also may communicate with various other vehicles 220, roadside units 222, base stations 224, and other external devices. The TCU/OBU 204 may be configured to perform operations for misbehavior detection as further described below.

The V2X processing device 204 may include a V2X antenna (e.g., an RF module 218), and may be configured to communicate with one or more ITS participants (e.g., stations) such as another vehicle 220, a roadside unit 222, and a base station 224 or another suitable network access point. In various embodiments, the V2X processing device 204 may receive information from a plurality of information sources, such as the in-vehicle network 210, infotainment system 212, various sensors 214, various actuators 216, and the RF module 218. The V2X processing device 204 may be configured to detect misbehavior in a V2X message from an ITS participant, as further described below.

Examples of an in-vehicle network 210 include a Controller Area Network (CAN), a Local Interconnect Network (LIN), a network using the FlexRay protocol, a Media Oriented Systems Transport (MOST) network, and an Automotive Ethernet network. Examples of vehicle sensors 214 include a location determining system (such as a Global Navigation Satellite Systems (GNSS) system, a camera, radar, lidar, ultrasonic sensors, infrared sensors, and other suitable sensor devices and systems. Examples of vehicle actuators 216 include various physical control systems such as for steering, brakes, engine operation, lights, directional signals, and the like.

Figure 3A:
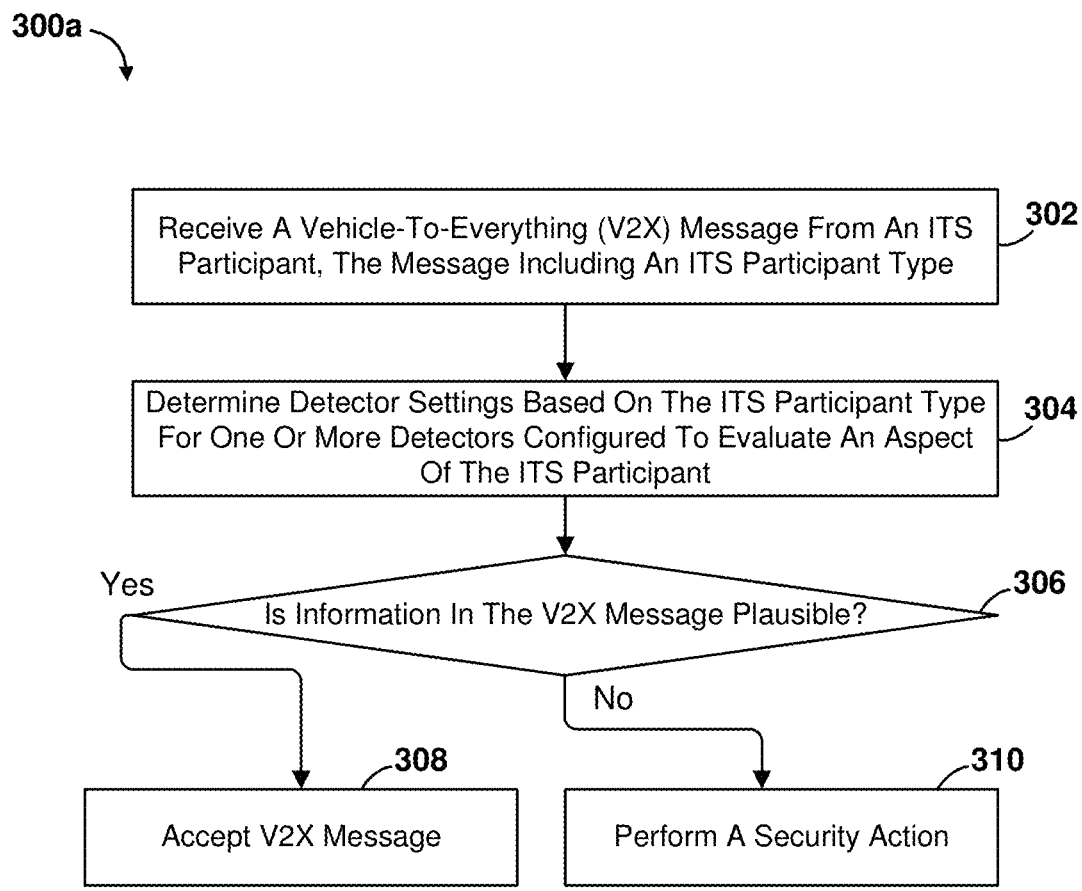
FIGS. 3A and 3B are a process flow diagram of an example method for misbehavior detection in accordance with various embodiments.

FIG. 3A is a process flow diagram of an example method 300a for misbehavior detection in accordance with various embodiments. With reference to FIGS. 1A-3A, the operations of the method 300a may be performed by a vehicle processor or processing system or V2X processing device (such as the V2X onboard equipment 102, 104, 106) that may be implemented in hardware elements, software elements, or a combination of hardware and software elements (referred to for conciseness as a "vehicle processing system"). For example, means for performing the operations of the method 300a may include the V2X processing device 204, the in-vehicle network 210, the infotainment system 212, the various sensors 214, the various actuators 216, and the RF module 218.

In block 302, the vehicle processing system may receive a V2X message from an ITS participant, in which the message includes an ITS participant type. For example, the vehicle processing system may receive a V2X message from the vehicle 12, and the V2X message may indicate (correctly) that the vehicle 12 is a car. In various embodiments, the V2X message may also include information indicating one or more other aspects of the ITS participant (i.e., vehicle 12). For example, the V2X message may indicate a length of the ITS participant, a width of the ITS participant, a height of the ITS participant, a position of the ITS participant, a speed of the ITS participant, an acceleration of the ITS participant, and/or another aspect of the ITS participant. In some embodiments, the ITS participant type may be indicated in a security header of the V2X message.

Means for performing the operations of block 302 include the V2X processing device 204, the in-vehicle network 210, the infotainment system 212, the various sensors 214, the various actuators 216, and the RF module 218.

In block 304, the vehicle processing system may determine detector settings based on the ITS participant type for one or more detectors configured to evaluate an aspect of the ITS participant. In some embodiments, the processor may determine one or more maximum or minimum plausible parameters for each of the one or more detectors for the indicated ITS participant type. In some embodiments, the vehicle processing system may determine detector settings for one or more detectors, such as a length detector, a width detector, a height detector, a position detector, a speed detector, an acceleration detector, an orientation detector, a behavior detector, and/or another suitable detector. Each detector may be configured to evaluate information provided in the V2X message about an aspect of the ITS participant. Means for performing the operations of block 304 include the V2X processing device 204, the in-vehicle network 210, and/or the infotainment system 212.

In determination block 306, the vehicle processing system may determine whether information in the V2X message is plausible using the detector settings that are based on the ITS participant type. In some embodiments, the vehicle processing system may receive an evaluation of the one or more detectors indicating whether an aspect of the ITS participant meets, is below, exceeds, etc. an applicable value, range of values, minimum value, a maximum value, and the like, for the aspect of the ITS participant.

As an example, consider the situation in which the V2X message from an ITS participant indicates that the ITS participant type is a car. That V2X message also may indicate that the ITS participant has a width of 20 feet. A width detector of the vehicle processing system may evaluate the ITS participant's reported width and provide as output an indication that the reported width in the V2X message (e.g., 20 feet) is not plausible for the indicated ITS participant type (e.g., a car).

As another example, consider the situation in which the V2X message from an ITS participant indicates that the ITS participant type is a pedestrian. The V2X message also may indicate that the ITS participant has a speed of 25 miles per hour. A speed detector of the vehicle processing system may evaluate the ITS participant's reported speed and provide as output an indication that the reported speed in the V2X message (e.g., 25 miles per hour) is not plausible for the indicated ITS participant type (e.g., a pedestrian).

In response to determining that the information in the V2X message is plausible (i.e., determination block 306="Yes"), the vehicle processing system may accept the V2X message in block 308. In some embodiments, the vehicle processing system may use information reported in the V2X message by the ITS participant for operational decisions or actions, such as maneuvering, steering, braking, path planning, and the like. In some embodiments, the vehicle processing system may pass on such information reported by the ITS participant to other ITS participants for use in operational decisions or actions. Means for performing the operations of block 308 include the V2X processing device 204, the in-vehicle network 210, the infotainment system 212, the various sensors 214, the various actuators 216, and the RF module 218.

In response to determining that the information in the V2X message is not plausible (i.e., determination block 306="No"), the vehicle processing system may perform a security action in block 310. In some embodiments, the vehicle processing system may transmit a misbehavior report about the ITS participant, for example, to an ITS network element, such as a security server, or to a network element performing a similar or suitable function. In some embodiments, the vehicle processing system may transmit a warning message to other ITS participants, such as other vehicles, RSUs, etc. indicating that the ITS participant has sent implausible information in a V2X message. In some embodiments, the vehicle processing system may ignore information reported in the V2X message by the ITS participant for operational decisions or actions, such as maneuvering, steering, braking, path planning, and the like. In some embodiments, the vehicle processing system may prevent the further transmission of information reported by the ITS participant to other ITS participants. Means for performing the operations of block 310 include the V2X processing device 204, the in-vehicle network 210, the infotainment system 212, the various sensors 214, the various actuators 216, and the RF module 218.

Figure 3B:
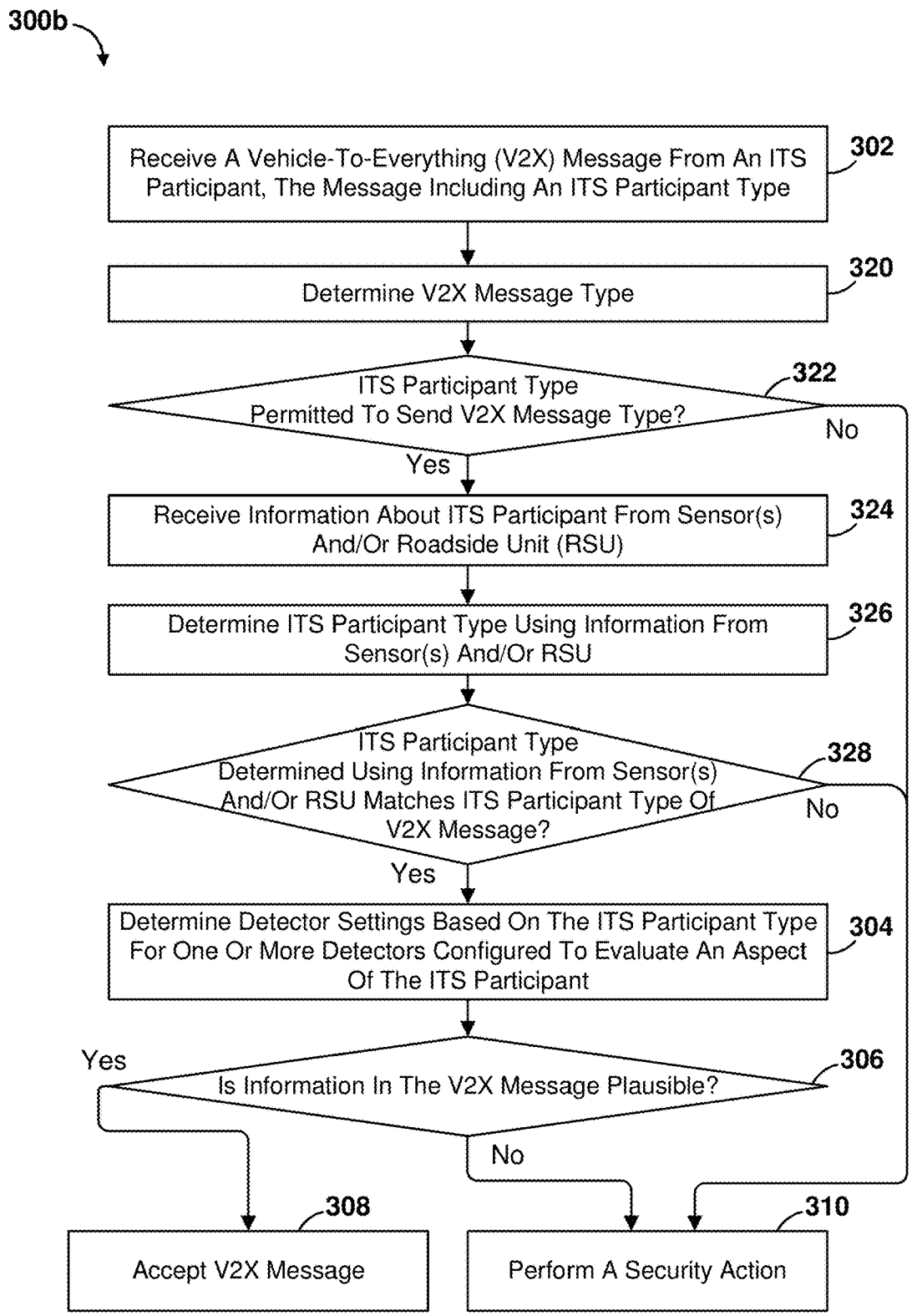

FIG. 3B is a process flow diagram of example operations 300b that may be performed as part of the method 300a for misbehavior detection in accordance with various embodiments. With reference to FIGS. 1A-3B, the operations 300b may be performed by a vehicle processor or processing system or V2X processing device (such as the V2X onboard equipment 102, 104, 106) that may be implemented in hardware elements, software elements, or a combination of hardware and software elements (referred to for conciseness as a "vehicle processing system"). For example, means for performing the operations 300b may include the V2X processing device 204, the in-vehicle network 210, the infotainment system 212, the various sensors 214, the various actuators 216, and the RF module 218.

In block 302, the vehicle processing system may receive a V2X message from an ITS participant, in which the message includes an ITS participant type, as described. In some embodiments, the ITS participant type may be indicated in a security header of the V2X message.

In block 320, the vehicle processing system may determine a message type of the V2X message. For example, the message type may include a BSM, a CAM, a vulnerable road user awareness message (VAM), or another suitable message type.

In determination block 322, the vehicle processing system may determine whether the ITS participant type is permitted to send the V2X message type. For example, a pedestrian is typically not authorized to send a CAM message type, but rather is authorized to send a VAM message type. A determination that an ITS participant of a particular type has sent a message type that such an ITS participant is not authorized to send may be an indication of V2X misbehavior. Means for performing the operations of determination block 322 include the V2X processing device 204, the in-vehicle network 210, and the infotainment system 212.

In response to determining that the ITS participant type is not permitted to send the V2X message type that was received (i.e., determination block 322="No"), the vehicle processing system may perform a security action in block 310 as described.

In response to determining that the ITS participant type is permitted to send the V2X message type that was received (i.e., determination block 322="Yes"), the vehicle processing system may receive information about the ITS participant from one or more sensors (e.g., the various sensors 214). Additionally or alternatively, the vehicle processing system may receive information about the ITS participant from an RSU or another suitable ITS station or network element (e.g., a base station, another vehicle, etc.). For example, the vehicle processing system may receive from the sensor(s) and/or RSU information indicating one or more aspects of the ITS participant, such as a length, a width, a height, a position, a speed, an acceleration, an orientation, an observable behavior, or another suitable aspect of the ITS participant. Means for performing the operations of block 324 include the V2X processing device 204, the in-vehicle network 210, the infotainment system 212, the various sensors 214, the various actuators 216, and the RF module 218.

In block 326, the vehicle processing system may determine an ITS participant type of the ITS participant from which the V2X message was received. In this manner, the vehicle processing system may determine an ITS participant type of the ITS participant independently from the ITS participant type indicated in the V2X message. Means for performing the operations of block 326 include the V2X processing device 204, the in-vehicle network 210, and the infotainment system 212.

In determination block 328, the vehicle processing system may determine whether the ITS participant type determined using the information from the one or more sensors and/or the RSU matches the ITS participant type indicated in the V2X message. Means for performing the operations of determination block 328 include the V2X processing device 204, the in-vehicle network 210, and the infotainment system 212.

In response to determining that the ITS participant type determined using the information from the one or more sensors and/or the RSU does not match the ITS participant type indicated in the V2X message (i.e., determination block 328="No"), the vehicle processing system may perform a security action in block 310 as described.

In response to determining that the ITS participant type determined using the information from the one or more sensors and/or the RSU matches the ITS participant type indicated in the V2X message (i.e., determination block 328="Yes"), the vehicle processing system may perform the operations of block 304 as described.

Figure 4A:
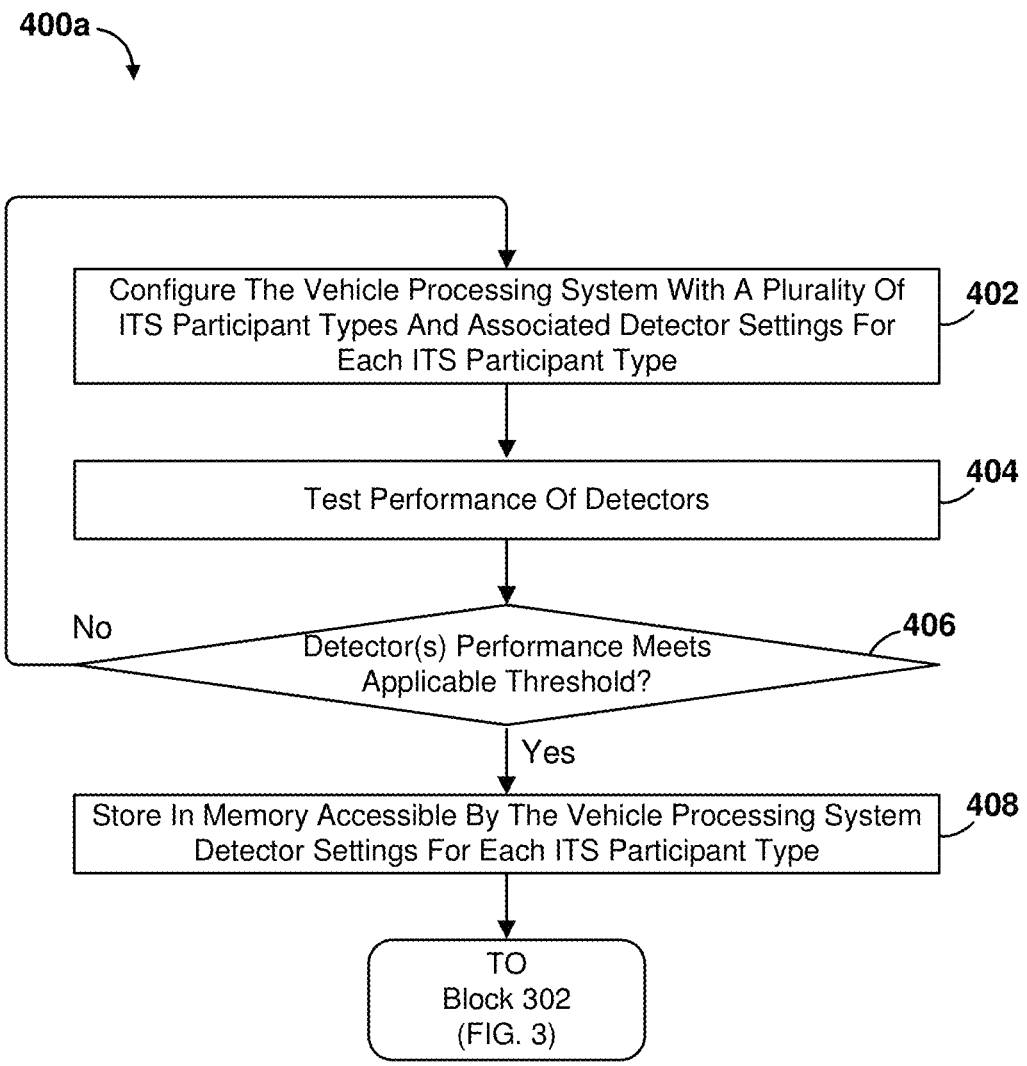
FIG. 4A is a process flow diagram of example operations that may be performed as part of the method for misbehavior detection in accordance with various embodiments.

FIG. 4A is a process flow diagram of example operations 400a that may be performed as part of the method 300a for misbehavior detection in accordance with various embodiments. FIG. 4B illustrates an algorithm to determine detector settings for detectors based on an ITS participant type. With reference to FIGS. 1A-4B, the operations 400a and 400b may be performed by a vehicle processor or processing system or V2X processing device (such as the V2X onboard equipment 102, 104, 106) that may be implemented in hardware elements, software elements, or a combination of hardware and software elements (referred to for conciseness as a "vehicle processing system"). For example, means for performing the operations of the operations 400a and 400b may include the V2X processing device 204, the in-vehicle network 210, the infotainment system 212, the various sensors 214, the various actuators 216, and the RF module 218.

Referring to FIG. 4A, the vehicle processing system may configure the vehicle processing system with a plurality of ITS participant types and associated detector settings for each ITS participant type in block 402. In some embodiments, the vehicle processing system may obtain from one or more sources of information or incorporate information that indicates plausible value(s) for each detector of a particular ITS participant type. Such information may be provided by or obtained from technical specifications (e.g., C-ITSS specification), technical standards (e.g., V2X standards), known maximum or minimum values for certain aspects (e.g., world speed records for humans and vehicles, maximum height and width values for known vehicles, and the like). In some embodiments, the vehicle processing system may determine detector settings for each of the plurality of ITS participant types using such information.

In some embodiments, the vehicle processing system may receive an update (e.g., an over the air (OTA) update) of information and/or indicated detector settings from a remote source that distributes detector settings and setting updates to some or all ITS participants in a region. Such distributed detector settings or detector setting updates may include detector settings for one or more ITS participant types. In some embodiments, the vehicle processing system may request and/or receive (e.g., from a network element 132, 134, 136) an update of detector settings for one or more ITS participant types based on an anticipated path, route, or destination of the vehicle. For example, when the vehicles is following a path, route, or destination in a mountainous area, the vehicle processing system may request and/or receive an update for detector settings for ITS participant types that are likely to be encountered in a mountainous area, such as cars, trucks, motorcycles, all terrain vehicles, pedestrians (e.g., hikers), and the like. In some embodiments, such an update may not include detector settings for ITS participant types that are not likely to be encountered in a mountainous area, such as boats, city buses, trams or urban light rail, and the like. In this manner, the amount of data in the updates, communication link overhead, and/or processing resources consumed by distributing detector setting update(s) may be reduced.

In some embodiments, the vehicle processing system may employ an algorithm to determine detector settings for detectors based on an ITS participant type. In some embodiments, such an algorithm 400b may be expressed as illustrated in FIG. 4B. For example, the algorithm 400b may determine detector settings 1 . . . J for each of a plurality of ITS participant types, such as a first ITS participant type (e.g., "Pedestrian"), a second ITS participant type (e.g., "Car"), and so forth, up to Z ITS participant types. For each detector setting, the algorithm may determine one or more parameters. For example, for the ITS participant type "Pedestrian", for a first detector 1, the algorithm may determine N settings 11, 12 . . . 1N. For a the detector J, the algorithm may determine M settings J1, J2 . . . JM.

Means for performing the operations of block 402 include the V2X processing device 204, the in-vehicle network 210, the infotainment system 212, and the RF module 218.

In block 404, the vehicle processing system may test a performance of the detectors. For example, the vehicle processing system may configure one or more detectors for a particular ITS participant type, and submit test data (e.g., test V2X information) that is known to be plausible or implausible for the ITS participant type to the detectors. Means for performing the operations of block 404 include the V2X processing device 204.

In determination block 406, the vehicle processing system may determine whether the performance of one or more detectors meets an applicable threshold. Means for performing the operations of determination block 406 include the V2X processing device 204.

In response to determining that the performance of one or more detectors does not meet an applicable threshold (i.e., determination block 406="No"), the vehicle processing system may configure the vehicle processing system with a plurality of ITS participant types and associated detector settings for each ITS participant type in block 402, as described.

In response to determining that the performance of one or more detectors meets an applicable threshold (i.e., determination block 406="Yes"), the vehicle processing system may store the detector settings in memory accessible by the vehicle processing system detector settings for each ITS participant type in block 408. In some embodiments, the vehicle processing system may store the detector settings in a memory, in a manner that the detector settings are accessible based on an ITS participant type. Means for performing the operations of block 408 include the V2X processing device 204.

The vehicle processing system may receive a V2X message from an ITS participant, the message including an ITS participant type indication, in block 302 of the method 300*a*, as described.

Figure 4C:
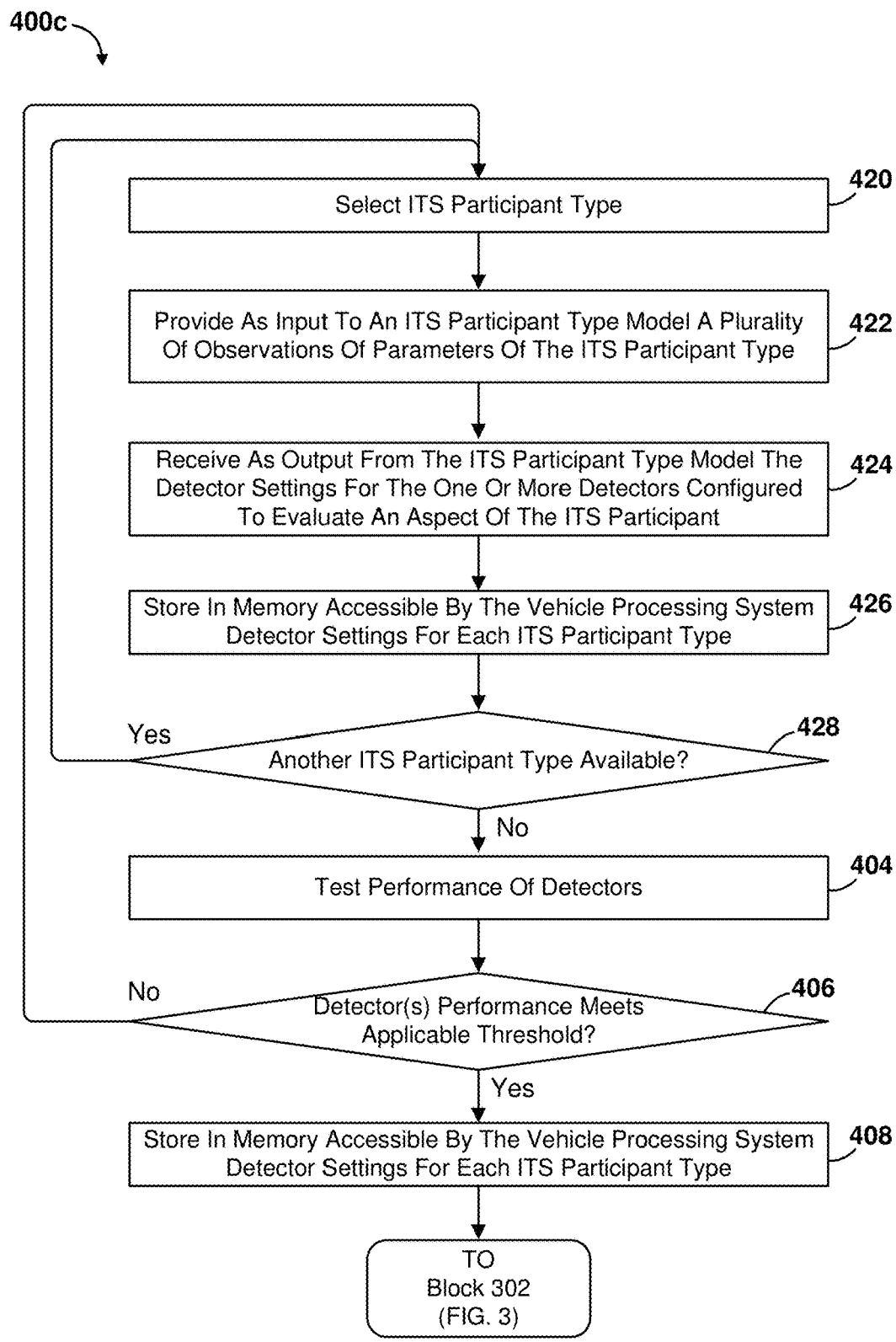
FIG. 4C is a process flow diagram of example operations that may be performed as part of the method for misbehavior detection in accordance with some embodiments.

FIG. 4C is a process flow diagram of example operations 400*c* that may be performed as part of the method 300*a* for misbehavior detection in accordance with various embodiments. In some embodiments, the vehicle processing system may configure the vehicle processing system with a plurality of ITS participant types and associated detector settings for each ITS participant type using a machine learning process to determine or to update various detector settings. With reference to FIGS. 1A-4C, the operations 400*c* may be performed by a vehicle processor or processing system or V2X processing device (such as the V2X onboard equipment 102, 104, 106) that may be implemented in hardware elements, software elements, or a combination of hardware and software elements (referred to for conciseness as a "vehicle processing system"). For example, means for performing the operations of the operations 400*c* may include the V2X processing device 204, the in-vehicle network 210, the infotainment system 212, the various sensors 214, the various actuators 216, and the RF module 218.

In block 420, the vehicle processing system may select an ITS participant type (e.g., pedestrian, car, bus, train, etc.). Means for performing the operations of block 420 include the V2X processing device 204.

In block 422, the vehicle processing system may provide as input to an ITS participant type model a plurality of observations of parameters of the ITS participant type. In various embodiments, the ITS participant type model may include a trained or self-training machine learning model configured to receive as input a plurality of observations of parameters of the ITS participant type, and to provide as output detector settings for the one or more detectors configured to evaluate an aspect of the ITS participant. Means for performing the operations of block 422 include the V2X processing device 204.

In block 424, the vehicle processing system may receive as output from the ITS participant type model the detector settings for the one or more detectors configured to evaluate an aspect of the ITS participant. Means for performing the operations of block 424 include the V2X processing device 204.

In block 426, the vehicle processing system may store the detector settings in memory accessible by the vehicle processing system detector settings for each ITS participant type in block. Means for performing the operations of block 426 include the V2X processing device 204.

In block 428, the vehicle processing system may determine whether another ITS participant type is available for which detector settings have not yet been received. Means for performing the operations of block 426 include the V2X processing device 204.

In response to determining that another ITS participant type is available for which detector settings have not yet been received (i.e., determination block 428="Yes") the vehicle processing system may select another may select an ITS participant type (e.g., pedestrian, car, bus, train, etc.) in block 420, as described.

In response to determining that no other ITS participant type is available for which detector settings have not yet been received (i.e., determination block 428="No"), the vehicle processing system may test the performance of the detectors in block 404, as described.

Figure 5:
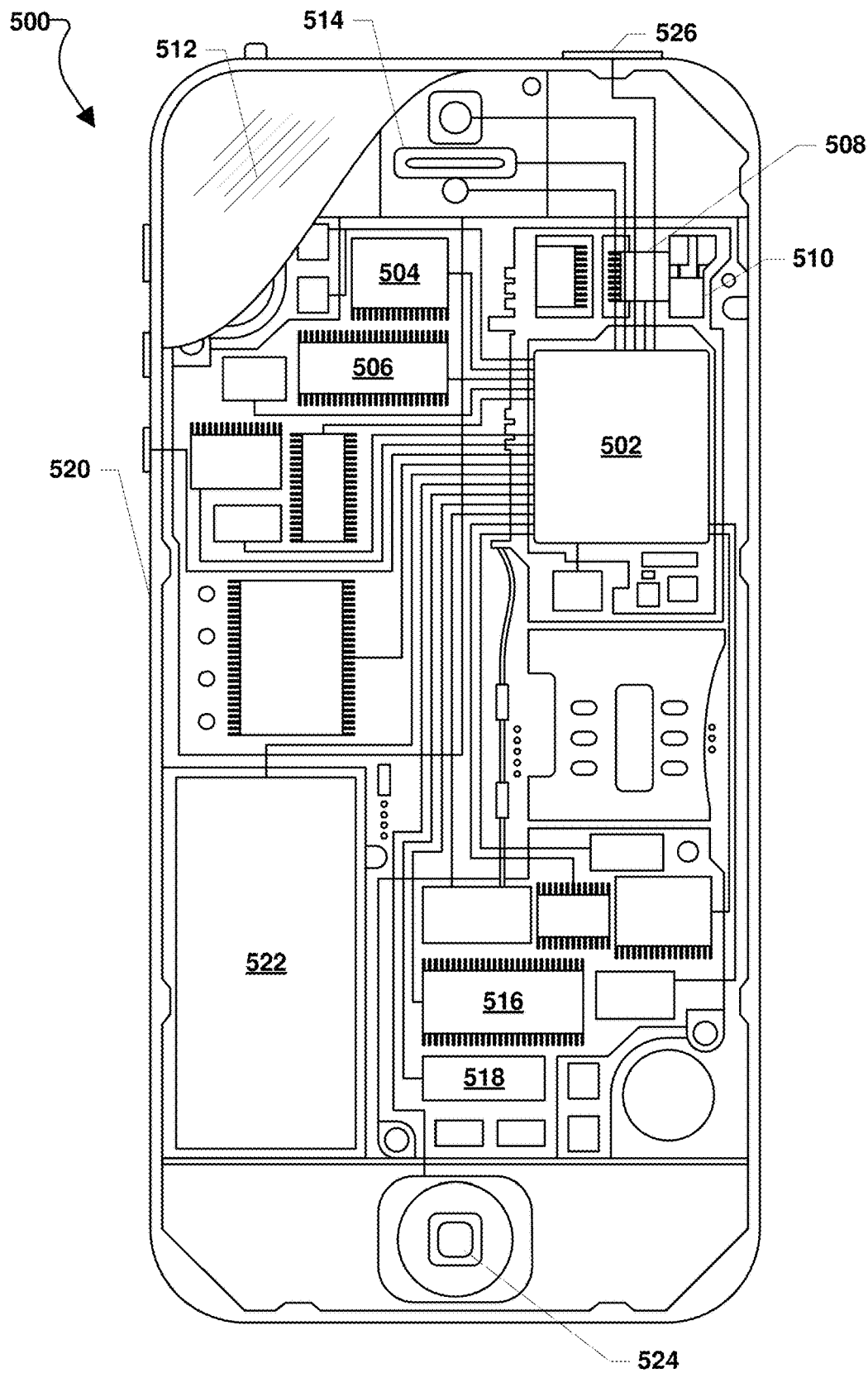
FIG. 5 is a component block diagram illustrating an example mobile computing device suitable for use with various embodiments.

FIG. 5 is a component block diagram illustrating an example mobile computing device suitable for use with various embodiments. With reference to FIGS. 1-5, various embodiments may be implemented in a wide variety of computing systems including on-board equipment as well as mobile computing devices, an example of which suitable for use with various embodiments is illustrated in FIG. 5. The mobile computing device 500 may include a processor 502 coupled to a touchscreen controller 504 and an internal memory 506. The processor 502 may be one or more multicore integrated circuits designated for general or specific processing tasks. The internal memory 506 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 504 and the processor 502 may also be coupled to a touchscreen panel 512, such as a resistive-sensing touchscreen, capacitive-sensing touchscreen, infrared sensing touchscreen, etc. Additionally, the display of the mobile computing device 500 need not have touch screen capability.

The mobile computing device 500 may have one or more radio signal transceivers 508 (e.g., Peanut, Bluetooth, Zig-Bee, Wi-Fi, RF radio) and antennae 510, for sending and receiving communications, coupled to each other and/or to the processor 502. The transceivers 508 and antennae 510 may be used with the above-mentioned circuitry to implement the various wireless transmission protocol stacks and interfaces. The mobile computing device 500 may include a cellular network wireless modem chip 516 that enables communication via a cellular network and is coupled to the processor.

The mobile computing device 500 may include a peripheral device connection interface 518 coupled to the processor 502. The peripheral device connection interface 518 may be singularly configured to accept one type of connection, or may be configured to accept various types of physical and communication connections, common or proprietary, such as Universal Serial Bus (USB), FireWire, Thunderbolt, or PCIe. The peripheral device connection interface 518 may also be coupled to a similarly configured peripheral device connection port (not shown).

The mobile computing device 500 may also include speakers 514 for providing audio outputs. The mobile computing device 500 may also include a housing 520, constructed of a plastic, metal, or a combination of materials, for containing all or some of the components described herein. One of ordinary skill in the art may recognize that the housing 520 may be a dashboard counsel of a vehicle in an on-board embodiment. The mobile computing device 500 may include a power source 522 coupled to the processor 502, such as a disposable or rechargeable battery. The rechargeable battery may also be coupled to the peripheral device connection port to receive a charging current from a source external to the mobile computing device 500. The mobile computing device 500 may also include a physical button 524 for receiving user inputs. The mobile computing device 500 may also include a power button 526 for turning the mobile computing device 500 on and off.

Figure 6:
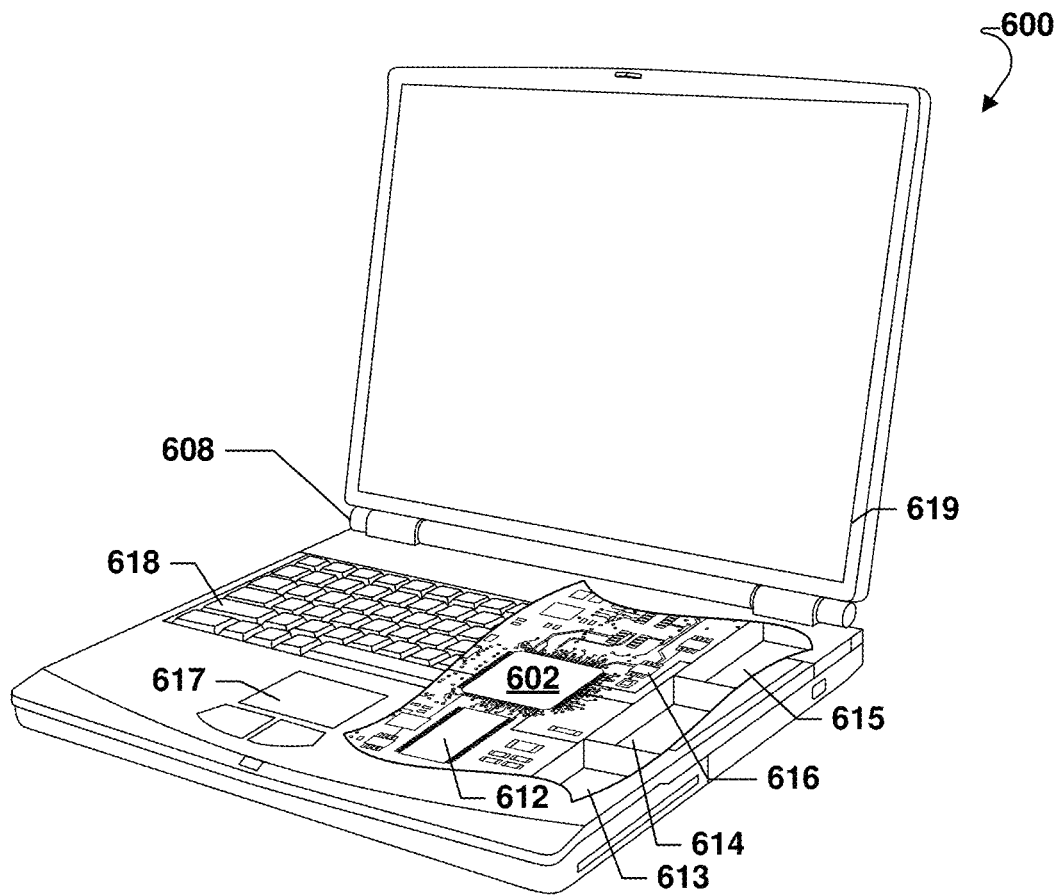
FIG. 6 is a component block diagram illustrating an example mobile computing device suitable for use with various embodiments.

FIG. 6 is a component block diagram illustrating an example mobile computing device suitable for use with various embodiments. With reference to FIGS. 1-6, various embodiments may be implemented in a wide variety of computing systems include a laptop computer 600 an example of which is illustrated in FIG. 6. Many laptop computers include a touchpad touch surface 617 that serves as the computer's pointing device, and thus may receive drag, scroll, and flick gestures similar to those implemented on computing devices equipped with a touch screen display and described above. A laptop computer 600 will typically include a processor 602 coupled to volatile memory 612 and a large capacity nonvolatile memory, such as a disk drive 613 of Flash memory. Additionally, the computer 600 may have one or more antenna 608 for sending and receiving electromagnetic radiation that may be connected to a wireless data link and/or cellular telephone transceiver 616 coupled to the processor 602. The computer 600 may also include a floppy disc drive 614 and a compact disc (CD) drive 615 coupled to the processor 602. In a notebook configuration, the computer housing includes the touchpad 617, the keyboard 618, and the display 619 all coupled to the processor 602. Other configurations of the computing device may include a computer mouse or trackball coupled to the processor (e.g., via a USB input) as are well known, which may also be used in conjunction with various embodiments.

Figure 7:
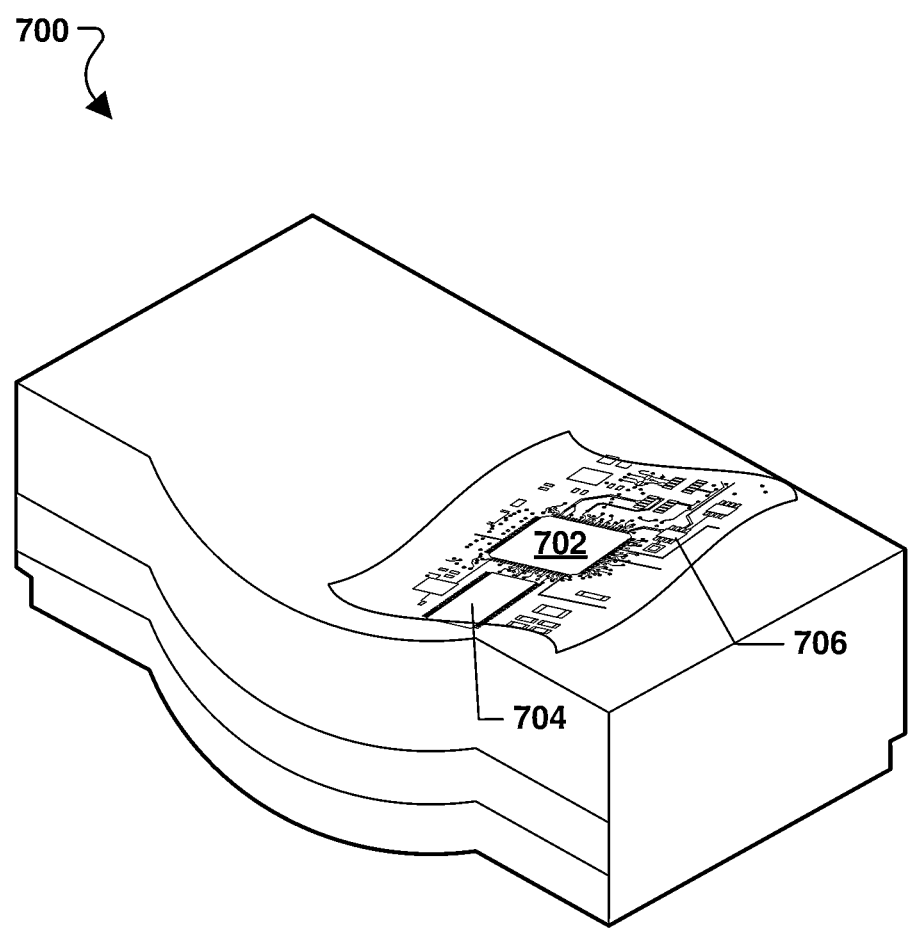
FIG. 7 is a component block diagram illustrating an example V2X onboard equipment for use with various embodiments.

FIG. 7 is a component block diagram illustrating an example V2X onboard equipment for use with various embodiments. With reference to FIGS. 1-7, various embodiments may be implemented in a wide variety of V2X onboard systems, an example of which is illustrated in FIG. 7. Such onboard equipment 700 may be configured to be implemented in a vehicle and connect to various vehicles systems and sensors. The onboard equipment 700 may include a processor 702 coupled to memory 704. The memory 704 may be any form of non-transitory media (e.g., read only memory (ROM), FLASH memory, etc.) and may store data and processor-executable instructions configured to cause the processor 702 to perform operations of any of the embodiment methods described herein. The processor 702 may also be coupled to a wireless transceiver 706 that is coupled to an antenna of the vehicle (not shown) and configured to transmit and receive V2X messages.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 300*a*, 300*b*, 400*a*, and 400*c* may be substituted for or combined with one or more operations of the methods and operations 300*a*, 300*b*, 400*a*, and 400*c*.

Implementation examples are described in the following paragraphs. While some of the following implementation examples are described in terms of example methods, further example implementations may include: the example methods discussed in the following paragraphs implemented by a vehicle processing device that may be an on-board unit, mobile device unit, mobile computing unit, or stationary roadside unit including a processor configured with processor-executable instructions to perform operations of the methods of the following implementation examples; the example methods discussed in the following paragraphs implemented by a vehicle processing device including means for performing functions of the methods of the following implementation examples; and the example methods discussed in the following paragraphs may be implemented as a non-transitory processor-readable storage medium having stored thereon processor-executable instructions configured to cause a processor of a vehicle processing device to perform the operations of the methods of the following implementation examples.

Example 1. A method performed by a processor of a vehicle processing system for misbehavior detection, including receiving a vehicle-to-everything (V2X) message from an Intelligent Transportation System (ITS) participant, the message including an ITS participant type indication, determining detector settings based on the ITS participant type for one or more detectors configured to evaluate an aspect of the ITS participant, determining whether information in the V2X message is plausible using the detector settings based on the ITS participant type for the one or more detectors, and performing a security action in response to determining that the information in the V2X message is not plausible.

Example 2. The method of example 1, in which the one or more detectors includes one or more of a length detector, a width detector, a height detector, a position detector, a speed detector, an acceleration detector, an orientation detector, or a behavior detector.

Example 3. The method of either of examples 1 and 2, in which the ITS participant type includes one or more of a car, a truck, a bus, a train, a boat, a pedestrian, a bicycle, a motorcycle, or a scooter.

Example 4. The method of any of examples 1-3, in which determining detector settings based on the ITS participant type includes determining one or more maximum or minimum plausible parameters for each of the one or more detectors for the ITS participant type.

Example 5. The method of any of examples 1-4, further including determining a V2X message type of the V2X message, and determining whether the ITS participant type is permitted to send the V2X message of the V2X message type, in which determining detector settings based on the ITS participant type for one or more detectors configured to evaluate an aspect of the ITS participant includes determining detector settings based on the ITS participant type for one or more detectors configured to evaluate an aspect of the ITS participant in response to determining that the ITS participant type is permitted to send the V2X message of the V2X message type.

Example 6. The method of example 5, further including performing a security action in response to determining that the ITS participant type is not permitted to send the V2X message of the V2X message type.

Example 7. The method of any of examples 1-6, further including determining an ITS participant type using information about the ITS participant received from one or more vehicle sensors, and determining whether the ITS participant type determined using information about the ITS participant received from one or more vehicle sensors matches the ITS participant type included in the V2X message, in which determining detector settings based on the ITS participant type for one or more detectors configured to evaluate an aspect of the ITS participant includes determining detector settings based on the ITS participant type for one or more detectors configured to evaluate an aspect of the ITS participant in response to determining that the ITS participant type determined using information about the ITS participant received from one or more vehicle sensors matches the ITS participant type included in the V2X message.

Example 8. The method of example 7, further including performing a security action in response to determining that the ITS participant type determined using information about the ITS participant received from one or more vehicle sensors does not match the ITS participant type included in the V2X message.

Example 9. The method of any of examples 1-8, further including configuring the vehicle processing system with a plurality of ITS participant types and associated detector settings for each ITS participant type, in which determining detector settings based on the ITS participant type for one or more detectors includes identifying the detector settings associated with the ITS participant type.

Example 10. The method of example 9, in which configuring the vehicle processing system with a plurality of ITS participant types and associated detector settings for each ITS participant type includes providing as input to an ITS participant type model a plurality of observations of parameters of a selected ITS participant type, receiving as output from the ITS participant type model the detector settings for the one or more detectors configured to evaluate an aspect of the ITS participant, and storing detector settings for the selected ITS participant type in memory accessible by the vehicle processing system.

Example 11. The method of any of examples 1-10, further including receiving from a remote source detector settings or detector setting updates for one or more ITS participant types, and storing the detector settings based on the ITS participant type in a compartmentalized manner by ITS participant type.

Example 12. The method of any of examples 1-11, in which performing a security action in response to determining that the information in the V2X message is not plausible includes transmitting a misbehavior report about the ITS participant.

Example 13. The method of any of examples 1-12, in which performing a security action in response to determining that the information in the V2X message is not plausible includes transmitting a warning about the ITS participant to another ITS participant.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a vehicle processing system for misbehavior detection, comprising:
receiving a vehicle-to-everything (V2X) message from an Intelligent Transportation System (ITS) participant, the message including an ITS participant type indication;
determining detector settings based on the ITS participant type for one or more detectors configured to evaluate an aspect of the ITS participant;
determining whether information in the V2X message is plausible using the detector settings based on the ITS participant type for the one or more detectors; and
performing a security action in response to determining that the information in the V2X message is not plausible.

2. The method of claim 1, wherein the one or more detectors comprise one or more of a length detector, a width detector, a height detector, a position detector, a speed detector, an acceleration detector, an orientation detector, or a behavior detector.

3. The method of claim 1, wherein the ITS participant type comprises one or more of a car, a truck, a bus, a train, a boat, a pedestrian, a bicycle, a motorcycle, or a scooter.

4. The method of claim 1, wherein determining detector settings based on the ITS participant type comprises determining one or more maximum or minimum plausible parameters for each of the one or more detectors for the ITS participant type.

5. The method of claim 1, further comprising:
determining a V2X message type of the V2X message; and
determining whether the ITS participant type is permitted to send the V2X message of the V2X message type,
wherein determining detector settings based on the ITS participant type for one or more detectors configured to evaluate an aspect of the ITS participant comprises determining detector settings based on the ITS participant type for one or more detectors configured to evaluate an aspect of the ITS participant in response to determining that the ITS participant type is permitted to send the V2X message of the V2X message type.

6. The method of claim 5, further comprising performing a security action in response to determining that the ITS participant type is not permitted to send the V2X message of the V2X message type.

7. The method of claim 1, further comprising:
determining an ITS participant type using information about the ITS participant received from one or more vehicle sensors; and
determining whether the ITS participant type determined using information about the ITS participant received from one or more vehicle sensors matches the ITS participant type included in the V2X message,
wherein determining detector settings based on the ITS participant type for one or more detectors configured to evaluate an aspect of the ITS participant comprises determining detector settings based on the ITS participant type for one or more detectors configured to evaluate an aspect of the ITS participant in response to determining that the ITS participant type determined using information about the ITS participant received from one or more vehicle sensors matches the ITS participant type included in the V2X message.

8. The method of claim 7, further comprising performing a security action in response to determining that the ITS participant type determined using information about the ITS participant received from one or more vehicle sensors does not match the ITS participant type included in the V2X message.

9. The method of claim 1, further comprising configuring the vehicle processing system with a plurality of ITS participant types and associated detector settings for each ITS participant type,
wherein determining detector settings based on the ITS participant type for one or more detectors comprises identifying the detector settings associated with the ITS participant type.

10. The method of claim 9, wherein configuring the vehicle processing system with a plurality of ITS participant types and associated detector settings for each ITS participant type comprises:
providing as input to an ITS participant type model a plurality of observations of parameters of a selected ITS participant type;
receiving as output from the ITS participant type model the detector settings for the one or more detectors configured to evaluate an aspect of the ITS participant; and
storing detector settings for the selected ITS participant type in memory accessible by the vehicle processing system.

11. The method of claim 1, further comprising:
receiving from a remote source detector settings or detector setting updates for one or more ITS participant types; and
storing the detector settings based on the ITS participant type in a compartmentalized manner by ITS participant type.

12. The method of claim 1, wherein performing a security action in response to determining that the information in the V2X message is not plausible comprises transmitting a misbehavior report about the ITS participant.

13. The method of claim 1, wherein performing a security action in response to determining that the information in the V2X message is not plausible comprises transmitting a warning about the ITS participant to another ITS participant.

14. A vehicle processing system, comprising:
a memory;
a transceiver; and
a processor coupled to the memory and the transceiver, wherein the processor is configured with processor-executable instructions to:
receive a vehicle-to-everything (V2X) message from an Intelligent Transportation System (ITS) participant, the message including an ITS participant type indication;
determine detector settings based on the ITS participant type for one or more detectors configured to evaluate an aspect of the ITS participant;
determine whether information in the V2X message is plausible using the detector settings based on the ITS participant type for the one or more detectors; and
perform a security action in response to determining that the information in the V2X message is not plausible.

15. The vehicle processing system of claim 14, wherein the one or more detectors comprise one or more of a length detector, a width detector, a height detector, a position detector, a speed detector, an acceleration detector, an orientation detector, or a behavior detector.

16. The vehicle processing system of claim 14, wherein the ITS participant type comprises one or more of a car, a truck, a bus, a train, a boat, a pedestrian, a bicycle, a motorcycle, or a scooter.

17. The vehicle processing system of claim 14, wherein the processor is further configured with processor-executable instructions to determine one or more maximum or minimum plausible parameters for each of the one or more detectors for the ITS participant type.

18. The vehicle processing system of claim 14, wherein the processor is further configured with processor-executable instructions to:
 determine a V2X message type of the V2X message;
 determine whether the ITS participant type is permitted to send the V2X message of the V2X message type; and
 determine detector settings based on the ITS participant type for one or more detectors configured to evaluate an aspect of the ITS participant in response to determining that the ITS participant type is permitted to send the V2X message of the V2X message type.

19. The vehicle processing system of claim 18, wherein the processor is further configured with processor-executable instructions to perform a security action in response to determining that the ITS participant type is not permitted to send the V2X message of the V2X message type.

20. The vehicle processing system of claim 14, wherein the processor is further configured with processor-executable instructions to:
 determine an ITS participant type using information about the ITS participant received from one or more vehicle sensors;
 determine whether the ITS participant type determined using information about the ITS participant received from one or more vehicle sensors matches the ITS participant type included in the V2X message; and
 determine detector settings based on the ITS participant type for one or more detectors configured to evaluate an aspect of the ITS participant in response to determining that the ITS participant type determined using information about the ITS participant received from one or more vehicle sensors matches the ITS participant type included in the V2X message.

21. The vehicle processing system of claim 20, wherein the processor is further configured with processor-executable instructions to perform a security action in response to determining that the ITS participant type determined using information about the ITS participant received from one or more vehicle sensors does not match the ITS participant type included in the V2X message.

22. The vehicle processing system of claim 14, wherein the processor is further configured with processor-executable instructions to:
 configure the vehicle processing system with a plurality of ITS participant types and associated detector settings for each ITS participant type; and
 identify the detector settings associated with the ITS participant type.

23. The vehicle processing system of claim 22, wherein the processor is further configured with processor-executable instructions to:
 provide as input to an ITS participant type model a plurality of observations of parameters of a selected ITS participant type;
 receive as output from the ITS participant type model the detector settings for the one or more detectors configured to evaluate an aspect of the ITS participant; and
 store detector settings for the selected ITS participant type in memory accessible by the vehicle processing system.

24. The vehicle processing system of claim 14, wherein the processor is further configured with processor-executable instructions to:
 receive from a remote source detector settings or detector setting updates for one or more ITS participant types; and
 store the detector settings based on the ITS participant type in a compartmentalized manner by ITS participant type.

25. The vehicle processing system of claim 14, wherein the processor is further configured with processor-executable instructions to transmit a misbehavior report about the ITS participant.

26. The vehicle processing system of claim 14, wherein the processor is further configured with processor-executable instructions to transmit a warning about the ITS participant to another ITS participant.

27. A vehicle processing system, comprising:
 means for receiving a vehicle-to-everything (V2X) message from an Intelligent Transportation System (ITS) participant, the message including an ITS participant type indication;
 means for determining detector settings based on the ITS participant type for one or more detectors configured to evaluate an aspect of the ITS participant;
 means for determining whether information in the V2X message is plausible using the detector settings based on the ITS participant type for the one or more detectors; and
 means for performing a security action in response to determining that the information in the V2X message is not plausible.

28. The vehicle processing system of claim 27, wherein means for determining detector settings based on the ITS participant type comprises means for determining one or more maximum or minimum plausible parameters for each of the one or more detectors for the ITS participant type.

29. The vehicle processing system of claim 27, further comprising:
 means for determining a V2X message type of the V2X message; and
 means for determining whether the ITS participant type is permitted to send the V2X message of the V2X message type,
 wherein means for determining detector settings based on the ITS participant type for one or more detectors configured to evaluate an aspect of the ITS participant comprises means for determining detector settings based on the ITS participant type for one or more detectors configured to evaluate an aspect of the ITS participant in response to determining that the ITS participant type is permitted to send the V2X message of the V2X message type.

30. A non-transitory processor-readable medium having stored thereon processor-executable instructions configured to cause a processor of a vehicle processing system to perform operations comprising:
 receiving a vehicle-to-everything (V2X) message from an Intelligent Transportation System (ITS) participant, the message including an ITS participant type indication;
 determining detector settings based on the ITS participant type for one or more detectors configured to evaluate an aspect of the ITS participant;

determining whether information in the V2X message is plausible using the detector settings based on the ITS participant type for the one or more detectors; and performing a security action in response to determining that the information in the V2X message is not plausible.

* * * * *